(No Model.)

E. LUNKENHEIMER.
STRAIGHT WAY VALVE.

No. 459,408. Patented Sept. 15, 1891.

Witnesses.
J. Thomson Cross
O. E. Wentworth

Inventor.
Edmund Lunkenheimer
per Peck & Rector
Attorneys.

UNITED STATES PATENT OFFICE.

EDMUND LUNKENHEIMER, OF CINCINNATI, OHIO.

STRAIGHT-WAY VALVE.

SPECIFICATION forming part of Letters Patent No. 459,408, dated September 15, 1891.

Application filed December 8, 1890. Serial No. 373,939. (No model.)

*To all whom it may concern:*

Be it known that I, EDMUND LUNKENHEIMER, a citizen of the United States, residing at Cincinnati, in the county of Hamilton and State of Ohio, have invented certain new and useful Improvements in Straight-Way Valves, of which the following is a description, reference being had to the accompanying drawings, forming part of this specification.

My invention relates to that class of valves in which the passage between the pipe connections, which are arranged in line with each other on opposite sides of the shell, is opened and closed by a pair of disks operated by a rocking spindle, to which a handle is applied, so that by moving said handle in one direction the disks are forced against the seats at the inner ends of the pipe connections to close the valve, while by moving it in the opposite direction they are withdrawn from their seats and moved out of line with the pipe connections to open the valve.

The novelty of my invention will be herein set forth, and specifically pointed out in the claims.

Figure 1:
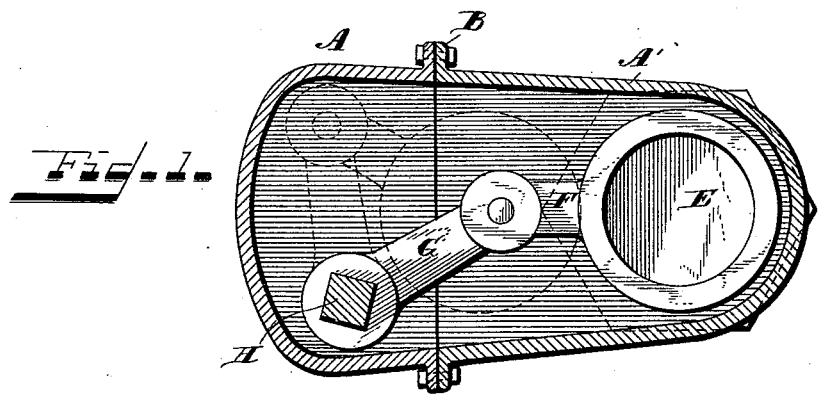
Figure 2:
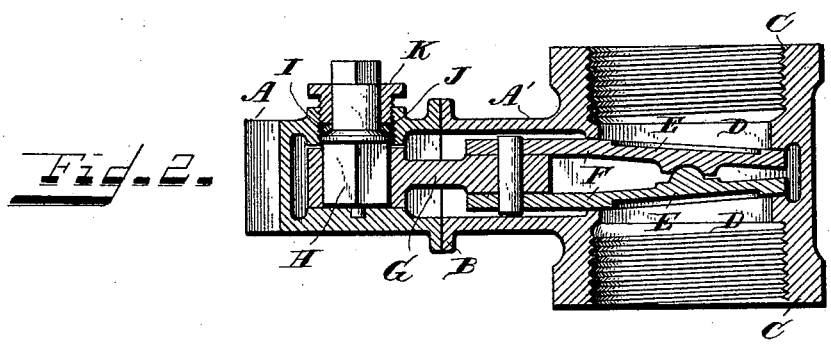
Figure 3:
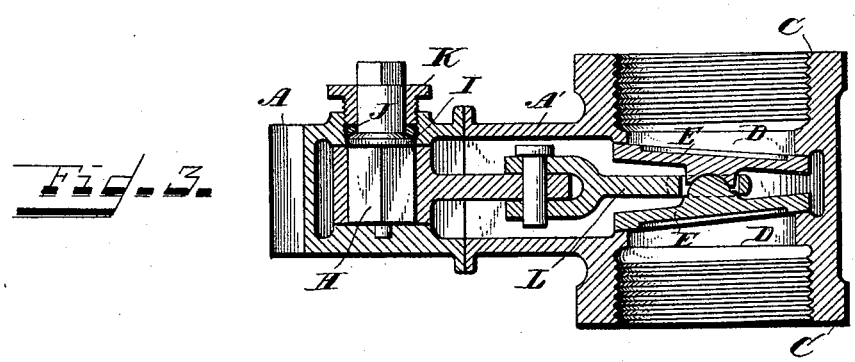

In the accompanying drawings, Figure 1 represents a sectional plan view of my improved valve on the line 1 1 of Fig. 2. Fig. 2 represents a sectional side elevation of the same on the line 2 2 of Fig. 1. Fig. 3 is a view corresponding to Fig. 2 and representing a modification in the connection between the valve-disks and the swinging arm on the rocking spindle.

The same letters of reference are used to indicate identical parts in all the figures.

The valve-shell is composed of two sections A A', bolted together at B. The interiorly-threaded pipe connections C C are cast integral with the section A' and are provided at their inner ends with the inclined seats D D. The two disks E E', having a ball-and-socket bearing between them, are provided with integral carriers F F, by which they are loosely coupled to the outer end of an arm G, carried by the rocking spindle H, whose squared portion fits a corresponding hole in the end of the arm. The spindle H is in this instance journaled in the section A of the shell, though it is evident that the section A might be made merely a cap for closing the open end of the section A', in which event the spindle would be journaled in the section A'.

An operating-handle of the usual form (not shown) is applied to the upper squared end of the spindle. By turning said handle and oscillating the spindle in the direction of the arrow in Fig. 1 the arm G will be swung into the left-hand end of the shell and the disks E be withdrawn from the line of the pipe connections, as shown by the dotted lines in Fig. 1, to open the passage through the valve. By turning the handle in the opposite direction and swinging the arm G back to the position shown in Fig. 1 the disks are forced firmly against the inclined seats D D to close the valve. The ball-and-socket bearing between the disks and the loose coupling of their integral carriers F F to the arm G permit the disks to readily adjust themselves to and tightly fit the seats D D when the valve is closed.

For the purpose of offering resistance to the turning of the spindle to cause the disks to remain at any point to which they may be moved, so that the valve may be opened to any degree desired and held there against ordinary shocks and jars, I journal the spindle in an adjustable frictional bearing. That shown in Fig. 2 is a suitable one, though not of itself forming a novel feature of my invention. Any other suitable one may be substituted for it. As shown in said figure the lower end of the spindle H rests upon the bottom of the shell, a stud on its under side fitting a socket in the shell to hold it in true position. At the upper end of its lower squared portion the spindle is provided with an integral friction-collar I, having a beveled upper side. Fitting upon this collar, the spindle being round, immediately above the collar, is a friction-ring J. This ring is so fitted in the threaded hole in the shell through which the spindle is inserted as to be held from revolving therein. This may be done by providing the edge of the ring with projections fitting in vertical grooves in the sides of the hole or in any other suitable way. Screwed into the upper end of the hole is the binding-plug K, a suitable packing-ring being interposed between its lower end and the ring J. By tightening up the plug K the lower end of the spindle may be made to bear upon the bottom of the shell and the friction-ring J upon the collar I with any pressure desired, so that the friction to be overcome by the turning of the spindle in opening and closing the valve may be regulated at will.

In Fig. 3 I have shown a modification in the construction, in which the valve-seats D D are inclined, as in Fig. 2, and the disks E E have a ball-and-socket bearing between them, as in the latter figure; but in Fig. 3 the disks E E do not have the integral carriers F F connecting them with the swinging arm G. Instead, the ball-and-socket bearing between them is encircled by a yoke or ring at the end of an arm or carrier L, whose opposite end straddles and is pivoted to the outer end of the arm G. When the rocking spindle and arm G are turned by the operating-handle to the position shown by the dotted lines in Fig. 1, the arm L withdraws the disks E E from the seats D D and opens the passage through the valve. When the spindle and arm are turned in the reverse direction, the arm L forces the disks against the seats D D to close the valve. The sides of the shell A' hold the disks together and prevent the ring at the end of the arm L from becoming disengaged from the ball-and-socket bearing.

I am aware that valves have heretofore been made with a shell of the same general shape as mine and having the pipe connections at one end and a rocking spindle in the opposite end, said rocking spindle carrying an arm similar to the arm G and said arm having coupled to it two disk-carriers, which moved the disks into and out of line with the pipe connections upon the rocking of the spindle; but in such valves with which I am familiar the valve-seats were parallel with each other and the two carriers were separate from the disks and extended between them. By inclining the valve-seats and abutting the inner sides of the disks directly against each other, with merely the interposed ball-and-socket bearing, and especially by making the disk-carriers integral with the disks, as shown in my preferred construction in Figs. 1 and 2, I am enabled to make a much more compact valve, reduce the thickness, and lessen the weight of the shell, and at the same time simplify, cheapen, and increase the efficiency of the valve.

Having thus fully described my invention, I claim—

1. In a straight-way valve, the combination of the shell composed of the two sections A A', the section A' having the opposite pipe connections C C and inclined seats D D at one end of the shell, the rocking spindle H, journaled in the section A at the opposite end of the shell, the arm G, carried by the rocking spindle H, and the two disks E E, having a ball-and-socket bearing between them and coupled to the end of the arm G by integral carriers F F, substantially as described.

2. In a straight-way valve, the combination of the shell having the opposite pipe connections C C at one end and the rocking spindle H at the other end, the inclined seats D D at the inner ends of the pipe connections C C, the swinging arm G, carried by the rocking spindle, and the two disks E E, having integral carriers coupled to the outer end of the arm G, the whole being arranged to operate substantially in the manner described.

3. In a straight-way valve, the combination of the shell composed of the two sections A A', having the opposite pipe connections C C and inclined valve-seats D D at one end, the rocking spindle H, journaled in adjustable frictional bearings near the other end, the swinging arm G, carried by the spindle H, and the disks E E, having the ball-and-socket bearing between them and provided with the integral carriers F F, coupled to the outer end of the arm G, substantially as and for the purpose described.

EDMUND LUNKENHEIMER.

Witnesses:
EDWARD RECTOR,
G. S. WENTWORTH.